US012633451B2

(12) United States Patent
Tsukada

(10) Patent No.: US 12,633,451 B2
(45) Date of Patent: May 19, 2026

(54) PRODUCTION METHOD FOR RARE-EARTH SINTERED MAGNET, AND WET-MOLDING DEVICE

(71) Applicant: PROTERIAL, LTD., Tokyo (JP)

(72) Inventor: Takashi Tsukada, Tokyo (JP)

(73) Assignee: PROTERIAL, LTD., Tokyo (JP)

( * ) Notice: Subject to any disclaimer, the term of this patent is extended or adjusted under 35 U.S.C. 154(b) by 759 days.

(21) Appl. No.: 17/913,219

(22) PCT Filed: Mar. 11, 2021

(86) PCT No.: PCT/JP2021/009861
§ 371 (c)(1),
(2) Date: Sep. 21, 2022

(87) PCT Pub. No.: WO2021/193115
PCT Pub. Date: Sep. 30, 2021

(65) Prior Publication Data

US 2023/0113317 A1 Apr. 13, 2023

(30) Foreign Application Priority Data

Mar. 26, 2020 (JP) ................................ 2020-055645

(51) Int. Cl.

| | |
|---|---|
| ***H01F 41/02*** | (2006.01) |
| ***B22F 3/16*** | (2006.01) |
| ***B22F 3/24*** | (2006.01) |
| ***H01F 1/057*** | (2006.01) |

(52) U.S. Cl.
CPC ................ *H01F 41/02* (2013.01); *B22F 3/16* (2013.01); *B22F 3/24* (2013.01); *H01F 1/0576* (2013.01); *H01F 1/0577* (2013.01); *B22F 2301/355* (2013.01)

(58) Field of Classification Search
None
See application file for complete search history.

(56) References Cited

U.S. PATENT DOCUMENTS

| | | | | |
|---|---|---|---|---|
| 5,080,731 | A | 1/1992 | Tabaru et al. | |
| 5,489,343 | A * | 2/1996 | Uchida | H01F 1/0577 419/30 |
| 2020/0058420 | A1 | 2/2020 | Chen et al. | |

FOREIGN PATENT DOCUMENTS

| | | | |
|---|---|---|---|
| JP | H02146705 | A | 6/1990 |
| JP | 08-88133 | A | 4/1996 |
| JP | 09-94814 | A | 4/1997 |

(Continued)

OTHER PUBLICATIONS

Official Communication issued in International Patent Application No. PCT/JP2021/009861, mailed on Apr. 27, 2021.

*Primary Examiner* — Xiaowei Su
(74) *Attorney, Agent, or Firm* — Keating & Bennett, LLP

(57) ABSTRACT

The production method for a rare-earth sintered magnet according to the present disclosure comprises: a step for producing a molded article by compression-molding a slurry containing a rare-earth element-containing alloy powder and a dispersion medium using a wet-molding device; and a step for sintering the molded article. When the slurry is being poured into the inside of a space forming a cavity of the wet-molding device, a magnetic field is not applied. By pressing of the slurry, the dispersion medium contained in the slurry starts to be removed from the inside of the space.

7 Claims, 5 Drawing Sheets

(56) References Cited

FOREIGN PATENT DOCUMENTS

| | | | |
|---|---|---|---|
| JP | 2001044055 | A | 2/2001 |
| JP | 2007149950 | A | 6/2007 |
| JP | 2008-251910 | A | 10/2008 |
| JP | 2020-027938 | A | 2/2020 |

* cited by examiner

PRODUCTION METHOD FOR RARE-EARTH SINTERED MAGNET, AND WET-MOLDING DEVICE

TECHNICAL FIELD

The present application relates to a method for producing a sintered rare-earth-based magnet, and a wet pressing apparatus.

BACKGROUND ART

Recently, sintered rare-earth-based magnets are in high demand. Among various types of sintered rare-earth-based magnets, sintered R-T-B-based magnets (R is at least one type of rare-earth element, T is mainly iron, and B is boron) are known as magnets of the highest performance, and are used for various types of motors such as voice coil motors (VCM) of hard disc drives, motors for electric vehicles (EV, HV, PHV, etc.) and motors for industrial equipment, home appliance products, and the like.

A sintered R-T-B-based magnet includes a main phase mainly formed of an $R_2T_{14}B$ compound, and a boundary phase at boundaries of the main phase. The $R_2T_{14}B$ compound, which is the main phase, is a ferromagnetic material having high saturation magnetization and an anisotropy field. In the boundary phase, a non-magnetic and low-melting-point R-rich phase having a concentrated rare-earth element (R) is present. Known methods for improving the magnetic characteristics of the sintered R-T-B-based magnet include (1) size reduction in the $R_2T_{14}B$ phase, (2) improvement of the degree of alignment of the $R_2T_{14}B$ phase, (3) reduction in the amount of oxygen, and (4) increase in the ratio of the $R_2T_{14}B$ phase.

Production of a sintered rare-earth-based magnet such as a sintered R-T-B-based magnet or the like uses, for example, an alloy powder having a predetermined particle size. Such an alloy powder is obtained by pulverizing a cast raw material alloy having a desired composition such as, for example, an ingot or a flake. The ingot is obtained by putting a molten metal material, produced by melting a metal material or the like, into a casting mold. The flake is obtained by a strip casting method. The alloy powder is compressed in an aligning magnetic field to produce a powder compact (compressed powder body), and then the powder compact is sintered. In this manner, the sintered rare-earth-based magnet is produced. If particles of the powder are oxidized at the time of the pulverization or pressing, the improvement of the magnetic characteristics is inhibited.

The powder compact may be produced by two types of pressing methods, namely, a dry pressing method and a wet pressing method. Patent Document 1 discloses a wet pressing method. The wet pressing method suppresses the oxidation of the powder particles, and thus is considered not to inhibit the improvement of the magnetic characteristics as easily as the dry pressing method.

CITATION LIST

Patent Literature

Patent Document 1: Japanese Laid-Open Patent Publication No. Hei 8-88133

SUMMARY OF INVENTION

Technical Problem

According to the wet pressing method disclosed in Patent Document 1, a slurry containing a rare-earth-based alloy powder is pressure-injected into a cavity of a die (into a space). Studies made by the present inventor have found out that even in such a case, the powder compact produced by compression in an aligning magnetic field easily has the "density thereof varied" or easily has the "alignment thereof disturbed".

The powder compact having the former inconvenience, namely, the powder compact having the "density thereof varied" may be broken or cracked while being removed from the die or while being sintered after being removed. The powder compact having the latter inconvenience, namely, the powder compact having the "alignment thereof disturbed" may have the magnetic characteristics thereof declined. The density variance or the degree of the alignment disturbance is specifically different in accordance with the relationship between the direction of pressing when the slurry is pressure-injected into the cavity of the die and the direction of the magnetic field, the state of the slurry in the cavity of the die, or the like. Therefore, it has been difficult to stably produce a sintered rare-earth-based magnet having high magnetic characteristics required thereof.

The present disclosure provides a method for producing a novel sintered rare-earth-based magnet and a novel wet pressing apparatus solving the above-described problems.

Solution to Problem

In a non-limiting embodiment, a method for producing a sintered rare-earth-based magnet according to the present disclosure includes supplying a slurry containing an alloy powder, containing a rare-earth element, and a dispersant into a space of a die; pressing the supplied slurry to form a compact; and sintering the compact. While the slurry is supplied into the space of the die, no magnetic field is applied. Before the dispersant is discharged from the space of the die, a transverse magnetic field in a direction orthogonal to a pressing direction starts being applied.

In an embodiment, the compact has a size of at least 90 mm (length)×at least 90 mm (width)×at least 90 mm (height).

In an embodiment, the method includes a first division step of cutting and dividing the compact into at least ten compact fragments, and a sintered body work production step of, after the first division step, sintering each of the plurality of compact fragments to produce a plurality of sintered body works.

In an embodiment, the method includes a second division step of, after the sintered body work production step, cutting and dividing each of the plurality of sintered body works into at least 100 sintered body fragments.

In an embodiment, the method includes forming a gap between a slurry pressing apparatus and a top surface of the slurry before the transverse magnetic field is applied, In a non-limiting embodiment, a method for producing a sintered rare-earth-based magnet according to the present disclosure includes the steps of preparing a wet pressing apparatus including a die having a through-hole, a lower punch movable upward and downward with respect to the die in a state where at least a tip of the lower punch is inserted into the through-hole, and an upper punch movable upward and downward with respect to the lower punch, wherein the upper punch has a bottom end having a plurality of discharge holes formed therein, the plurality of discharge holes allowing a liquid to pass therethrough; a top end of the lower punch and the bottom end of the upper punch form a cavity inside the through-hole; and a distance between the top end of the lower punch and the bottom end of the upper punch is shortened to decrease a volume of the cavity; preparing a slurry containing an alloy powder, containing a rare-earth element, and a dispersant; forming a space by an inner wall of the through-hole of the wet pressing apparatus and the top end of the lower punch of the wet pressing apparatus, and injecting the slurry into the space to fill the space with the slurry; closing the space by the bottom end of the upper punch to form the cavity filled with the slurry; shortening the distance between the bottom end of the upper punch and the top end of the lower punch in a state where a transverse magnetic field, in a direction perpendicular to a direction in which the lower punch is movable upward and downward, is applied to the cavity, and discharging the dispersant contained in the slurry through the plurality of discharge holes of the upper punch to produce a compact of the alloy powder; and sintering the compact. While the slurry is injected into the space, no magnetic field is applied to the space and the space is temporarily or intermittently covered with a non-magnetic lid. Before the transverse magnetic field is applied to the cavity, the non-magnetic lid is retracted from a position at which the non-magnetic lid covers the space.

In an embodiment, in the step of producing the compact of the alloy powder while shortening the distance between the bottom end of the upper punch and the top end of the lower punch, a filter cloth or a filter is located between the slurry in the cavity and the bottom end of the upper punch.

In an embodiment, the method includes the steps of after filling the space with the slurry, moving the non-magnetic lid from the position at which the non-magnetic lid covers the space; and at least before applying the transverse magnetic field, moving the lower punch downward with respect to the die to form a gap between the slurry and at least one of the bottom end of the upper punch and the filter cloth.

In an embodiment, the gap has a size not shorter than 2 mm and not longer than 4 mm. In an embodiment, the method includes after filling the space with the slurry, moving the non-magnetic lid from the position at which the non-magnetic lid covers the space; and before starting discharging the dispersant contained in the slurry through the plurality of discharge holes of the upper punch, start applying the transverse magnetic field.

In an embodiment, the method includes the step of, while injecting the slurry into the space, moving the non-magnetic lid upward and downward to temporarily allow the space to be in communication with the outside of the wet pressing apparatus.

In an embodiment, while the slurry is injected, the alloy powder in the slurry has a concentration of 75 to 88% by mass.

A wet pressing apparatus according to the present disclosure is a wet pressing apparatus producing a compact of a rare-earth-based alloy powder. The wet pressing apparatus includes a die having a through-hole; a lower punch movable upward and downward with respect to the die in a state where at least a tip of the lower punch is inserted into the through-hole; an upper punch movable upward and downward with respect to the lower punch, the upper punch having a bottom end having a plurality of discharge holes formed therein, the plurality of discharge holes allowing a liquid to pass therethrough; and an electromagnetic coil applying a transverse magnetic field, in a direction perpendicular to a direction in which the lower punch is movable upward and downward, to the inside of the through-hole. The die has an injection opening through which a slurry containing the rare-earth-based alloy powder is injected into a space formed by an inner wall of the through-hole and a top end of the lower punch. The wet pressing apparatus further includes a non-magnetic lid temporarily or intermittently covering the space while the slurry is injected into the space.

In an embodiment, the wet pressing apparatus further includes a controller controlling operations of the upper punch, the lower punch, the die, the electromagnetic coil and the non-magnetic lid. The controller is configured to execute the steps of forming the space by the inner wall of the through-hole of the wet pressing apparatus and the top end of the lower punch of the wet pressing apparatus, and injecting the slurry into the space to fill the space with the slurry; closing the space by the bottom end of the upper punch to form a cavity filled with the slurry; and shortening a distance between the bottom end of the upper punch and the top end of the lower punch in a state where the transverse magnetic field, in the direction perpendicular to the direction in which the lower punch is movable upward and downward, is applied to the cavity, and discharging the dispersant contained in the slurry through the plurality of discharge holes of the upper punch to produce a compact of the rare-earth-based alloy powder. While the slurry is injected into the space, no magnetic field is applied to the space and temporarily or intermittently covering the space with the non-magnetic lid. Before the transverse magnetic field is applied to the cavity, the non-magnetic lid is moved from a position at which the non-magnetic lid covers the space.

Advantageous Effects of Invention

According to an embodiment of the present disclosure, a slurry is supplied into a space of a die uniformly with the concentration variance thereof being suppressed. This suppresses the density variance or the alignment disturbance of the powder compact, and suppresses occurrence of breakage or cracks caused by the density variance or the alignment disturbance. Therefore, a sintered rare-earth-based magnet having high magnetic characteristics required thereof are produced stably.

DESCRIPTION OF EMBODIMENTS

Figure 1:
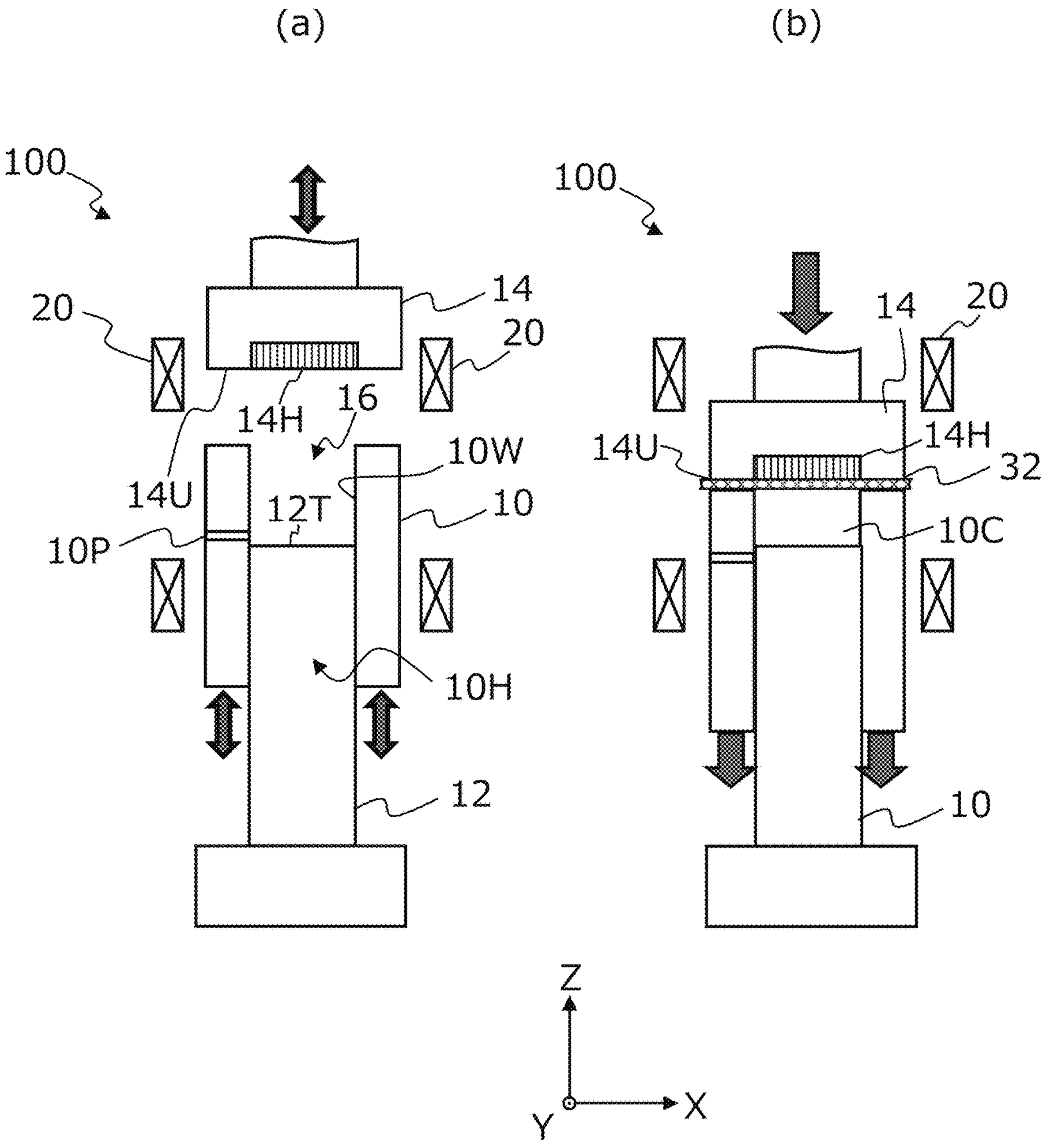
FIG. 1 shows an example of basic structure of a wet pressing apparatus 100 according to an embodiment.

As a result of studies, the present inventor has found out that in the case where a slurry is supplied to a space of a die with no application of a magnetic field and a transverse magnetic field pressing method described below is used after the slurry is supplied, the slurry is supplied uniformly into the space of the die with the concentration variance thereof being suppressed.

Before embodiments of the present disclosure are described, the knowledge found out by the present inventor and the technological background thereof will be described.

Methods for producing a powder compact for a sintered rare-earth-based magnet include a dry pressing method of pressing a powder of a rare-earth-based alloy in a dry state, and a wet pressing method of supplying a slurry, containing an alloy powder dispersed in a dispersant such as oil or the like, into a cavity of a die and pressing the slurry. The pressing methods performed with a magnetic field are classified into a transverse magnetic field pressing method, by which the direction in which the alloy powder is pressed and thus compressed (pressing direction) is orthogonal to the direction of the magnetic field applied to the alloy powder, and a parallel magnetic field pressing method, by which the pressing direction is parallel to the direction of the magnetic field applied to the alloy powder.

The dry pressing method allows a pressing apparatus to have a relatively simple structure, and does not require the step of removing the dispersant during the pressing, the step of removing the dispersant from the compact after the pressing, or the like. Especially according to the transverse magnetic field pressing method, the pressing direction and the magnetic field application direction are orthogonal to each other. Therefore, the alignment of the alloy powder in the magnetic field application direction is not disturbed, and a compact having a high degree of alignment is produced. By contrast, according to the parallel magnetic field pressing method, the pressing direction and the magnetic field application direction are parallel to each other. Therefore, the alignment of the alloy powder is easily disturbed at the time of the pressing, and thus the degree of alignment is lower than according to the transverse magnetic field pressing method. For this reason, in the case where the dry pressing method is used, the transverse magnetic field pressing method is mainly used. For producing, for example, disc-shaped, ring-shaped or thin plate-shaped compacts, which are difficult to be produced by the transverse magnetic field pressing method, the parallel magnetic field pressing method is mainly used.

However, according to the dry pressing method, the alloy powder inevitably contacts the air when being supplied to the cavity and at the time of the pressing. The compact also contacts the air when being removed from the cavity after the pressing is finished. Therefore, the amount of oxygen in the compact is increased to decline the magnetic characteristics. In addition, it is difficult to avoid large friction between particles of the alloy powder or between the alloy powder and the die. This increases the resistance when the alloy powder is rotated or aligned by the applied magnetic field, and there is a limit on the increase in the degree of alignment.

By contrast, the wet pressing method requires supply of a slurry and removal of a dispersant, and therefore, requires the pressing apparatus to have a relatively complicated structure. However, the dispersant suppresses the oxidation of the alloy powder and the compact, and thus the amount of oxygen in the compact is decreased. In addition, the dispersant is present between the alloy powder particles at the time of the pressing with the magnetic field. Therefore, the alloy powder particles are not strongly restricted by a force of friction or the like and are rotated more easily to the magnetic field application direction. This provides a higher degree of alignment. For these reasons, the wet pressing method has an advantage of producing a sintered rare-earth-based magnet having higher magnetic characteristics than the dry pressing method. As can be seen, use of the wet pressing method tends to provide a higher degree of alignment and a higher oxidation suppression effect, and to provide a sintered rare-earth-based magnet having higher magnetic characteristics than use of the dry pressing method.

However, the wet pressing method also has disadvantages. According to the wet pressing method, while the slurry is put into the cavity and pressed with the magnetic field, most of the dispersant (oil, etc.) in the slurry needs to be discharged outside. Therefore, at least one of an upper punch and a lower punch has a discharge hole formed for the dispersant. When the upper punch and/or the lower punch is moved to decrease the volume of the cavity, the dispersant contained in the pressurized slurry is discharged through the hole. At this point, the dispersant in a portion of the slurry that is close to the discharge hole is first discharged among various portions of the slurry. Therefore, on an initial stage of the pressing, a layer called a “cake layer” is formed in the portion close to the discharge hole. The cake layer has a density of the alloy powder that is higher than the rest of the slurry.

As the upper punch and/or the lower punch is moved to advance the pressing, a larger amount of dispersant is discharged. The cake layer expands in the cavity, resulting in the entirety of the cavity being occupied by the cake layer having the high density of the alloy powder (having a low density of the dispersant). The resultant compact has the alloy powder particles bonded to each other relatively weakly.

In the case where the transverse magnetic field pressing method is used, if the cake layer is formed in the portion close to the discharge hole on the initial stage of the pressing, the direction of the magnetic field tends to be curved. A reason for this is that the cake layer has a high density of the alloy powder (has a large amount of alloy powder particles per unit volume) and thus has a higher magnetic permeability than the portion of the slurry other than the cake layer (portion having a smaller amount of alloy powder particles per unit volume). As a result, the magnetic field tends to be converged to the cake layer. For this reason, the magnetic field is curved toward the cake layer inside the cavity even through, outside the cavity, being applied in a direction generally perpendicular to a side surface of the cavity. The alloy powder is aligned along the curved magnetic field. Therefore, the post-pressing compact may possibly have a portion in which the alignment is curved. Such a portion in which the alignment is curved decreases the degree of alignment of the compact. This may cause a situation where the resultant sintered rare-earth-based magnet does not have sufficiently high magnetic characteristics. This problem that the magnetic characteristics are declined because of the curved magnetic field is more conspicuous as the size of the cavity in the magnetic field application direction is larger (for example, in the case where the size of the cavity in this direction is 15 mm or longer, typically, longer than 30 mm). In the case where the size of the cavity in the pressing direction is 90 mm or longer, the magnetic field is curved significantly. This conspicuously decreases the magnetic characteristics of the sintered rare-earth-based magnet and causes many cracks in the post-sintering magnet. For these reasons, it has been impossible to mass-produce such a large compact by the wet pressing method. Therefore, in order to produce a compact that is long in the pressing direction, it is needed to solve the above-described problems. The studies made by the present inventor have found out that the above-described problems occur especially easily in the case where the concentration of the slurry is varied in the cavity or the slurry is not supplied uniformly into the cavity.

By contrast, according to the parallel magnetic field pressing method, the magnetic field is applied in a direction parallel to the pressing direction, namely, in a direction from the upper punch toward the lower punch. Therefore, even if the cake layer is formed in the portion close to the dispersant discharge hole of the upper punch and/or the lower punch, the magnetic field is not easily curved and thus easily advances straight from a portion where there is no cake layer into the cake layer. In this state, there is no restriction by the size of the cavity in the magnetic field application direction, unlike in the case of the transverse magnetic field pressing method. However, according to the parallel magnetic field pressing method, the alloy powder particles are pivoted at the time of the pressing to easily disturb the alignment, and therefore, it is difficult to realize high remanence $B_r$ uniformly.

So far, compacts having a long size in the magnetic field application direction have been produced mainly by the transverse magnetic field pressing method and the dry pressing method. However, the dry pressing method causes the amount of oxygen in the compact to be increased and thus declines the magnetic characteristics, and also has a limit on the increase in the degree of alignment.

A method for producing a sintered rare-earth-based magnet and a wet pressing apparatus according to the present disclosure solve the above-described problems of the wet pressing method caused in the case where the transverse magnetic field pressing method is used. Therefore, the method and the wet pressing apparatus according to the present disclosure allow stable production of, by the transverse magnetic field pressing method, a powder compact (green compact) having a size of 90 mm or longer in the pressing direction, specifically, a compact having a size of at least 90 mm (length)×90 mm (width)×90 mm (height) (either the length direction or the width direction is the magnetic field application direction, and the height direction is the pressing direction), preferably a compact having a size of at least 100 mm (length)×100 mm (width)×90 mm (height). The expression "having a size of at least 90 mm (length)×90 mm (width)×90 mm (height)" indicates that the size in the length direction is at least 90 mm, the size in the width direction is at least 90 mm, and the size in the height direction is at least 90 mm. This is also applicable to the expression "having a size of at least 100 mm (length)×100 mm (width)×90 mm (height)". It is preferred that the compact has a parallelepiped shape. A parallelepiped compact is easily divided into a plurality of compact fragments. Alternatively, the compact may have another shape.

Hereinafter, embodiments of the present disclosure will be described with reference to the drawings.

<Example of Basic Structure>

Figure 2:
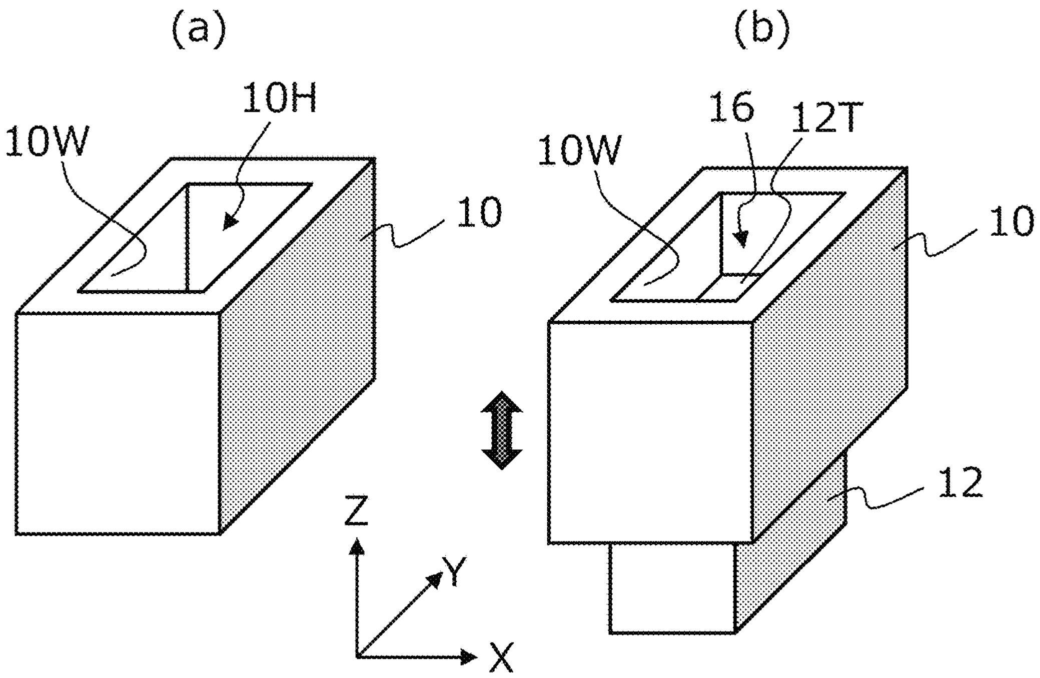
FIG. 2 provides perspective views schematically showing an example of structure of a die 10 included in the wet pressing apparatus 100.

First, with reference to FIG. 1 and FIG. 2, an example of basic structure of a wet pressing apparatus according to an embodiment of the present disclosure will be described. FIG. 1 shows an example of basic structure of a wet pressing apparatus 100 according to this embodiment. FIG. 2 provides perspective views schematically showing an example of structure of a die 10 included in the wet pressing apparatus 100. In the figures, an X axis, a Y axis and a Z axis orthogonal to each other are shown for reference. The Z axis is parallel to the vertical direction, and the Y axis is perpendicular to the sheet of paper of the figures. An XY plane including the X axis and the Y axis is horizontal.

The wet pressing apparatus 100 according to this embodiment includes the die 10 having a through-hole 10H as shown in, for example, FIG. 2(*a*). The die 10 is formed of a magnetic material that transmits a magnetic flux. The through-hole 10H runs through the die 10 from a top end to a bottom end thereof in the Z axis direction. The through-hole 10H is defined by an inner wall 10W. A cross-section of the through-hole 10H perpendicular to the Z axis has a certain shape and a certain size along the Z axis direction. In this example, the through-hole 10H has a parallelepiped shape. The shape of the through-hole 10H is not limited to this. The inner wall 10W is not limited to being a plane, and may be partially or entirely curved.

The shape and the size of the compact to be produced depend on the shape and the size of the through-hole 10H. In the case where, for example, a compact having a size of 100 mm (length)×100 mm (width)×90 mm (height) is to be produced, the cross-section of the through-hole 10H parallel to the XY plane may have a size of 100 mm (length) or shorter ×100 mm (width) or shorter. In the case where a larger compact having a size of, for example, at least 150 mm (length)×150 mm (width)×100 mm (height) is to be produced, the cross-section of the through-hole 10H parallel to the XY plane may have a size of 150 mm (length) or shorter×150 mm (width) or shorter.

Referring to FIG. 1 again, the wet pressing apparatus 100 includes a lower punch 12 movable upward and downward with respect to the die 10 in a state where at least a tip of the lower punch 12 is inserted into the through-hole 10H, and an upper punch 14 movable upward and downward with respect to the lower punch 12. In this embodiment, the upper punch 14 has a bottom end 14U having a plurality of discharge holes 14H formed therein. The plurality of discharge holes 14H allow a liquid (liquid component) contained in a slurry to pass therethrough. The slurry contains, for example, an alloy powder containing a rare-earth element, iron and boron (R-T-B-based alloy powder) and a dispersant.

According to the present disclosure, "movable upward and downward" indicates being movable in the vertical direction. The expression "A is movable upward and downward with respect to B" indicates that the distance between A and B in the vertical direction increases or decreases. Therefore, a form in which the lower punch 12 is movable upward and downward with respect to the die 10 encompasses a form in which the lower punch 12 is movable upward and downward while the die 10 is kept still, a form in which the die 10 is movable upward and downward while the lower punch 12 is kept still, and a form in which the die 10 and the lower punch 12 are movable in the same direction or in the opposite direction. In the state shown in FIG. 1(*b*), as compared with the state shown in FIG. 1(*a*), the die 10 and the upper punch 14 have been moved downward while the lower punch 12 is kept still. Namely, the lower punch 12 has been moved upward with respect to the die 10.

In the state shown in FIG. 1(*a*), a space 16 is formed by the inner wall 10W of the through-hole 10H of the die 10 and a top end 12T of the lower punch 12. The space 16 has a capacity capable of receiving the slurry. The upper punch 14 is located above the space 16, but the space 16 is opened upward. In other words, a portion of the lower punch 12 is inserted into a bottom portion of the through-hole 10H of the die 10, while the space 16 is not closed by the upper punch 14. FIG. 2(*b*) schematically shows a state where the space 16 is formed by the inner wall 10W of the through-hole 10H of the die 10 and the top end 12T of the lower punch 12. The lower punch 12 inserted into the through-hole 10H of the die 10 and the inner wall 10W of the through-hole 10H are slidably in contact with each other. The inner wall 10W and the lower punch 12 are in contact with each other such that the space 16 holds the liquid component of the slurry with no leak.

FIG. 1(*b*) will now be referred to. In the state shown in FIG. 1(*b*), the bottom end 14U of the upper punch 14 has been moved downward so as to press the die 10 downward. As a result, the space 16 is closed by the upper punch 14 to form a cavity. In the example shown in FIG. 1(*b*), a "filter cloth" 32 is located between the upper punch 14 and the die 10. The filter cloth 32 is a cloth-like filtering material formed by knitting synthetic fibers or the like, and may be referred to as a "filter". Examples of the filter include a filter cloth, a filter paper, a porous filter, and a metal filter. Such a filter prevents particles of the alloy powder from entering the discharge holes 14H more certainly, and allows only the dispersant to be transmitted therethrough. The filter cloth 32 has small pores having a size determined so as not to transmit the rare-earth alloy powder particles almost at all. The filter cloth 32 is specifically attached on the upper punch 14 so as to cover the plurality of discharge holes 14H provided at the bottom end 14U of the upper punch 14. In FIG. 1(*b*), only a portion of the filter cloth 32 is shown for the sake of simplicity. In actuality, the filter cloth 32 may be used while extending long in the X-axis direction and being wound along a roller. Rotation of such a roller allows a portion of the filter cloth 32 that is in contact with the bottom end 14U of the upper punch 14 to be switched to another portion. As a result, a region of the filter cloth stained by the pressing is replaced with another region for the next cycle of the pressing step.

In the example shown in FIG. 1(*b*), the die 10, as well as the upper punch 14, has been moved downward as compared with in the state shown in FIG. 1(*a*). The distance between the top end 12T of the lower punch 12 and the bottom end 14U of the upper punch 14 is shortened, so that the capacity of a cavity 10C is decreased. After the space 16 shown in FIG. 1(*a*) is filled with the slurry but before the state shown in FIG. 1(*b*) is realized, the liquid component of the slurry is discharged outside from the inside of the cavity 10C through the filter cloth 32 and the discharge holes 14H of the upper punch 14.

As shown in FIG. 1, the die 10 has an injection opening 10P, through which the slurry is injected into the space 16 formed by the inner wall 10W of the through-hole 10H and the top end 12T of the lower punch 12. The injection opening 10P is not limited to being provided in the number of one, and a plurality of the injection openings 10P may be provided. One die 10 is not limited to having one through-hole 10H, and may have a plurality of the through-holes 10H. In the case where one die 10 includes a plurality of through-holes 10H, the wet pressing apparatus 100 includes one lower punch 12 for each of the plurality of through-holes 10H, namely, has a plurality of the lower punches 12. The injection opening 10P is in communication with a slurry supply device (hydraulic device including a hydraulic cylinder), and the slurry pressurized by the hydraulic cylinder or the like is supplied into the space 16 through the injection opening 10P.

The wet pressing apparatus 100 includes an electromagnetic coil 20 applying a transverse magnetic field to the inside of the through-hole 10H of the die 10. The transverse magnetic field is perpendicular to the direction in which the lower punch 12 is movable upward and downward (Z axis direction, i.e., vertical direction) (transverse magnetic field is in a horizontal direction). In the example shown in FIG. 1, the electromagnetic coil 20 generates a transverse magnetic field, having a magnetic flux extending in the X axis direction, in the cavity 10C. As described below, in this embodiment, while the slurry is injected into the space 16 through the injection opening 10P, the upper punch 14 is at a position away from the die 10 as shown in FIG. 1(*a*) and no magnetic field is applied.

Figure 3:
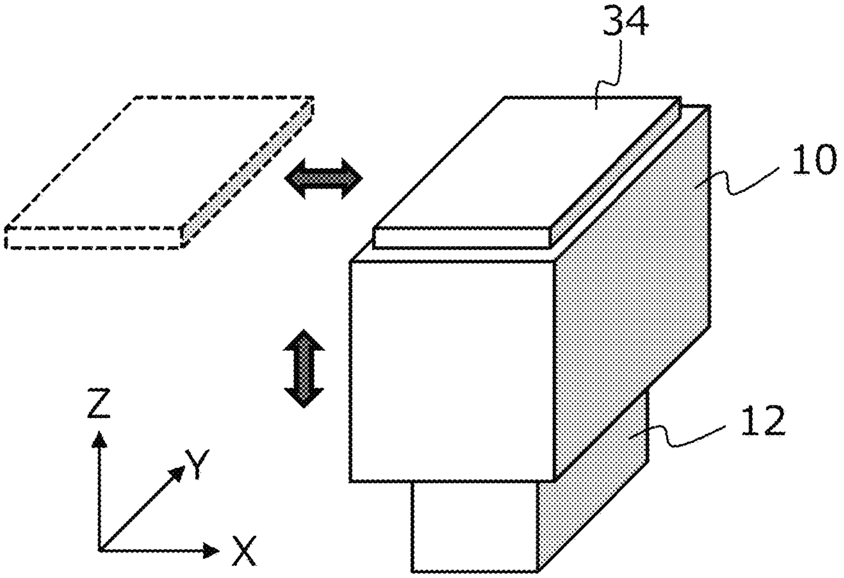
FIG. 3 is a perspective view schematically showing an example of a non-magnetic lid 34.

The wet pressing apparatus 100 according to this embodiment further includes a "non-magnetic lid" not shown in FIG. 1. The non-magnetic lid temporarily or intermittently covers the space 16 while the slurry is injected into the space 16. FIG. 3 is a perspective view schematically showing an example of the non-magnetic lid 34. In the example shown in FIG. 3, the non-magnetic lid 34 fully covers the through-hole 10H of the die 10. In FIG. 3, the dashed line schematically shows a state where the non-magnetic lid 34 is at a retracted position. The non-magnetic lid 34 has a role described below.

The "non-magnetic lid" is not indispensable to carry out the method for producing a sintered rare-earth-based magnet according to the present disclosure.

The wet pressing apparatus 100 according to an embodiment of the present disclosure includes a controller controlling the operations of the upper punch 14, the lower punch 12, the die 10, the electromagnetic coil 20 and the non-magnetic lid 34. Such a controller may be realized by a computer operating in accordance with a program stored on a storage device.

<Production Method>

Figure 4:
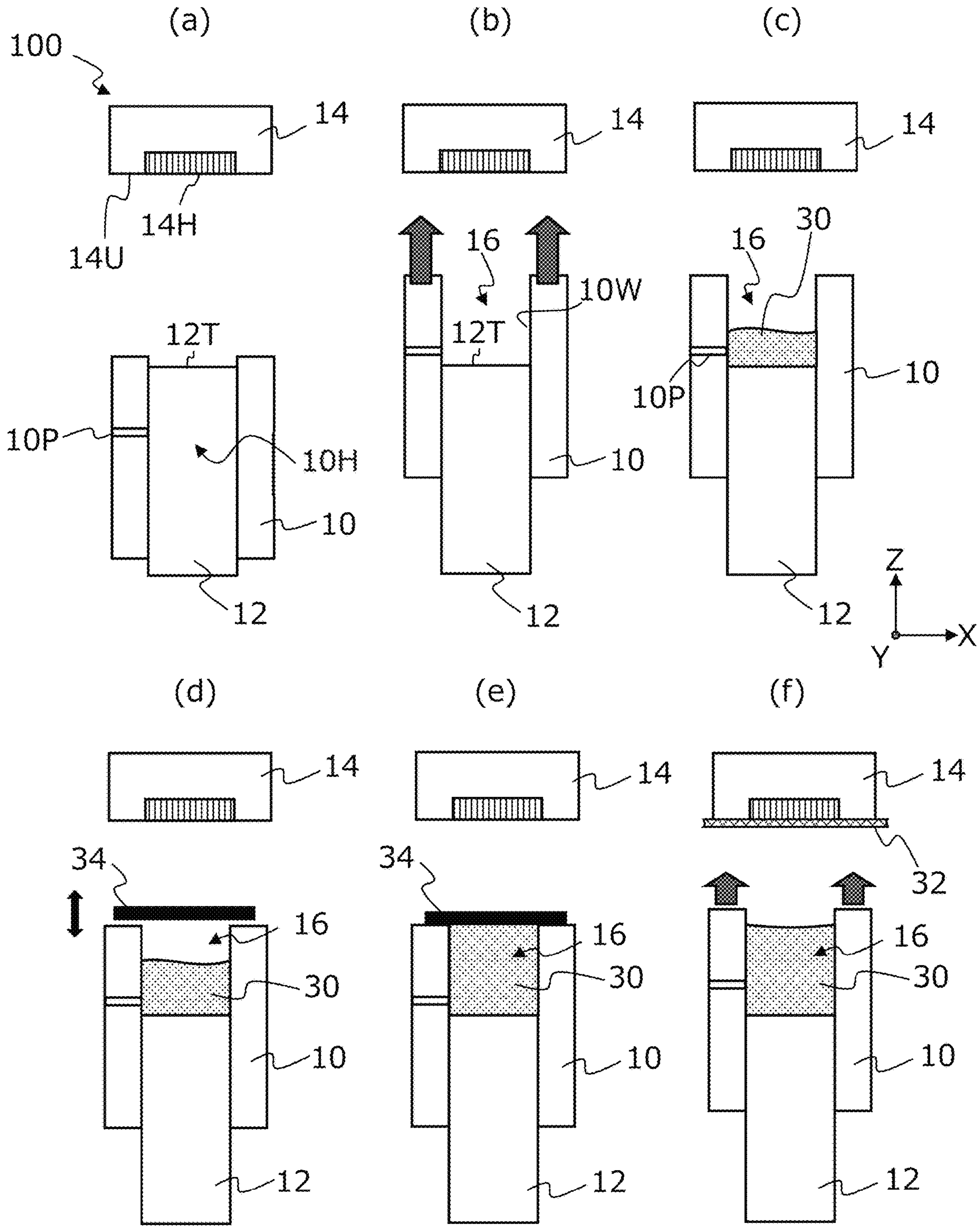
FIG. 4 shows a method for producing a sintered rare-earth-based magnet according to this embodiment.
Figure 5:
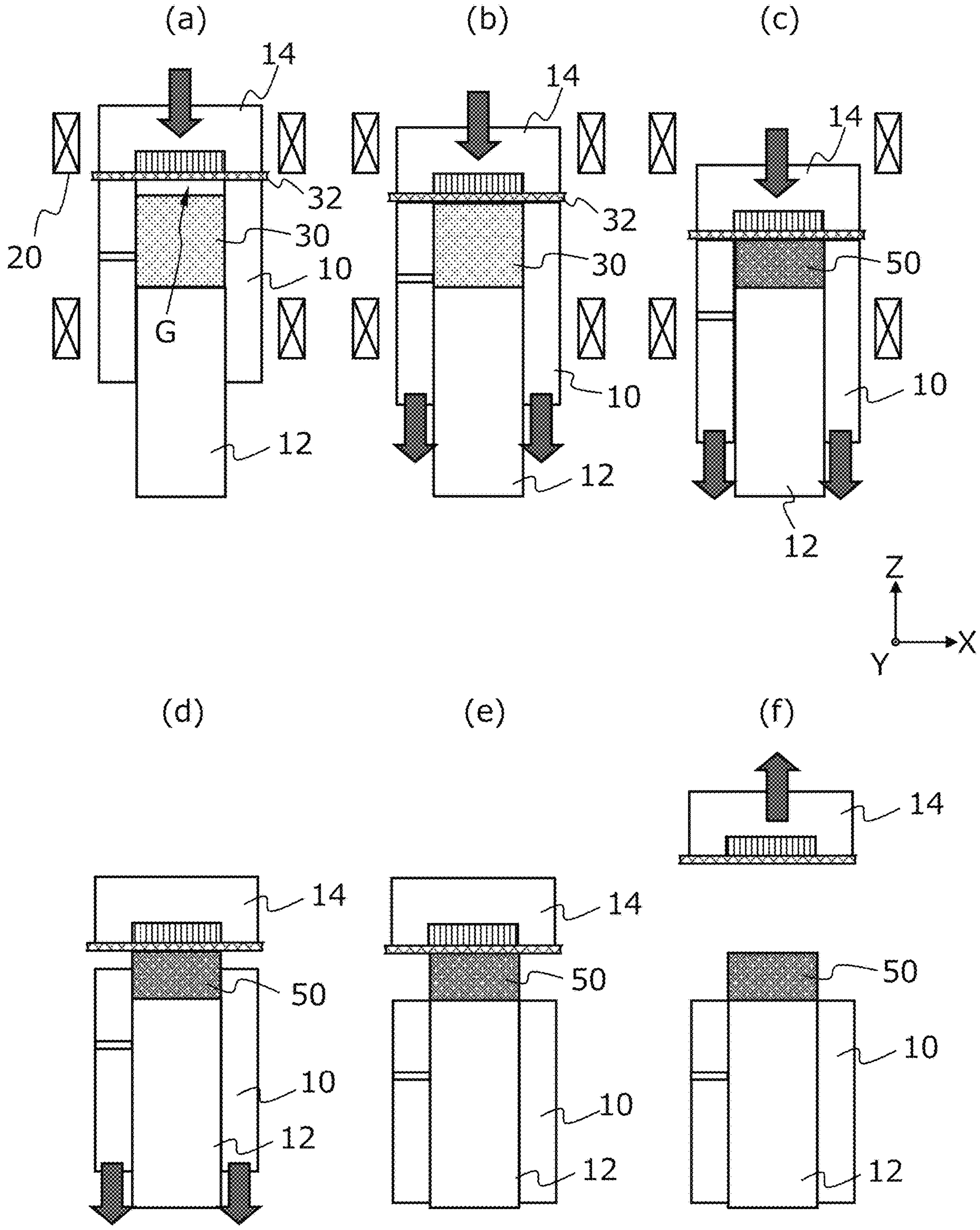
FIG. 5 shows the method for producing the sintered rare-earth-based magnet according to this embodiment.

Hereinafter, with reference to FIG. 4 and FIG. 5, a method for producing a sintered rare-earth-based magnet according to an embodiment of the present disclosure will be described. FIG. 4 shows a method for producing the sintered rare-earth-based magnet according to this embodiment. FIG. 5 shows the method for producing the sintered rare-earth-based magnet according to this embodiment. FIG. 4 does not show the electromagnetic coil 20.

The method for producing the sintered rare-earth-based magnet according to this embodiment includes the following steps.

(1) Preparation of a Slurry

For example, a step of preparing a slurry containing an alloy powder containing a rare-earth element (preferably, an alloy powder containing a rare-earth element, iron and boron) and a dispersant is performed.

Composition of the Alloy Powder

The alloy powder may have a composition of a known sintered rare-earth-based magnet encompassing, for example, a sintered R-T-B-based magnet (R is at least one type of rare-earth element (concept including yttrium (Y)), T is iron (Fe) or iron and cobalt (Co), and B is boron) and a sintered samarium-cobalt-based magnet.

A sintered R-T-B-based magnet is preferred. A reason for this is that the sintered R-T-B-based magnet exhibits the highest magnetic energy product among various types of magnets, and costs relatively low.

Hereinafter, preferred compositions of the sintered R-T-B based magnet will be described.

R is at least one selected from Nd, Pr, Dy and Tb. Preferably, R contains Nd or Pr. More preferably, a combination of rare-earth elements represented by Nd—Dy, Nd—Tb, Nd—Pr-Dy, or Nd—Pr-Tb is used.

Among the elements usable for R, Dy and Tb are specifically effective to improve the $H_{cJ}$. In addition to the above-listed elements, Ce, La or any other rare-earth element is usable in a small amount. Alternatively, misch metal or didymium may be used. R does not need to be a pure element, and may contain impurities unavoidably mixed during the production, in an amount of an industrially permissible range. R is contained at a conventionally known content, and is preferably contained at a content that is, for example, not lower than 25% by mass and not higher than 35% by mass. If the R content is lower than 25% by mass, high magnetic characteristic, especially, high $H_{cJ}$ may not be obtained. If the R content is higher than 35% by mass, the Br may be decreased.

T contains iron (a case where T is substantially formed of iron is encompassed), and at most 50% by mass of the iron may be replaced with cobalt (Co) (a case where T is substantially formed of iron and cobalt is encompassed). Co is effective to improve the temperature characteristics and the corrosion resistance. The alloy powder may contain cobalt at a content that is not higher than 10% by mass. A content of T may be a part other than R and B, or a part other than R, B and M described below.

A content of B may be a known content, and is preferably, for example, 0.8% by mass to 1.2% by mass. If the B content is lower than 0.8% by mass, high $H_{cJ}$ may not be obtained. If the B content is higher than 1.2% by mass, the $B_r$ may be decreased. A part of B may be replaced with C (carbon). Such replacement with C may improve the corrosion resistance of the magnet. In the case of B+C (in the case where both B and C are contained), it is preferred that the total content thereof is set to the above-described range of B after the number of atoms of C that have replaced B is converted to the number of atoms of B.

In addition to the above-listed elements, an M element may be incorporated in order to improve the $H_{cJ}$. The M element is at least one selected from the group consisting of Al, Si, Ti, V, Cr, Mn, Ni, Cu, Zn, Ga, Zr, Nb, Mo, In, Sn, Hf, Ta and W. A content of the M element is preferably not higher than 5.0% by mass. A reason for this is that if the M content is higher than 5.0% by mass, the $B_r$ may be decreased. Unavoidable impurities may be contained.

Method for Producing the Alloy Powder

The alloy powder is produced as follows, for example. An ingot or a flake of a raw material alloy for a rare-earth-based magnet (preferably, a raw material alloy for an R-T-B-based magnet) having a desired composition is produced by a melting method. The alloy ingot or the alloy flake is caused to absorb (occlude) hydrogen, and a course-pulverized powder is produced by a hydrogen pulverization method.

The course-pulverized powder is further pulverized by a jet mill or the like to produce a fine-pulverized powder.

An example of method for producing a raw material alloy for an R-T-B-based magnet will be described.

A metal material adjusted in advance such that the final product has a required composition is processed by an ingot casting method, namely, is melted and put into a casting mold. As a result, an alloy ingot is produced.

Alternatively, a molten metal material may be processed by a rapid cooling method, for example, a strip casting method or a centrifugal casting method. As a result, an alloy flake is produced. In the case where the strip casting method or the centrifugal casting method is used, the molten metal material is put into contact with a monoaxial roll, a biaxial roll, a rotatable disc, a rotatable cylindrical casting mold or the like to be rapidly cooled, and as a result, a coagulated alloy thinner than the alloy produced by the ingot method is produced.

According to the embodiments of the present invention, the alloy produced by either the ingot method or the rapid cooling method is usable. It is preferred that the alloy is produced by the rapid cooling method.

A raw material alloy for the R-T-B-based magnet produced by such a rapid cooling method (rapidly cooled alloy) usually has a thickness in the range of 0.03 mm to 10 mm, and is flake-shaped or plate-shaped. The molten alloy starts coagulating from a surface that is in contact with the cooling roll (roll contact surface), and crystal grows like columns in a thickness direction from the roll contact surface. The rapidly cooled alloy is cooled in a shorter time than an alloy (ingot alloy) produced by the conventional ingot casting method (mold casting method), and therefore, includes a finer texture, has a shorter crystal grain size, and a larger area size of grain boundaries. An R-rich phase expands broadly in the grain boundaries. Therefore, the R-rich phase in the alloy produced by the rapid cooling method is highly dispersed.

For this reason, the alloy is easily broken at the grain boundaries by the hydrogen pulverization method. In the case where the rapidly cooled alloy is pulverized by the hydrogen pulverization method, the particle size of the hydrogen-pulverized powder (coarse-pulverized powder) is, for example, 1.0 mm or shorter.

The coarse-pulverized powder thus obtained is pulverized by a jet mill or the like. As a result, an R-T-B-based alloy powder having a $D_{50}$ particle size of 2 to 7 μm measured by an airflow-dispersion laser diffraction method is produced.

It is preferred that the pulverization by the jet mill is performed in (a) an atmosphere formed of nitrogen gas and/or argon gas (Ar gas) having an oxygen content of substantially 0% by mass, or (b) an atmosphere formed of nitrogen gas and/or Ar gas having an oxygen content of 0.005 to 0.5% by mass.

In order to control the amount of nitrogen in the sintered body to be obtained, it is more preferred to use Ar gas for an atmosphere in the jet mill and introduce a trace amount of nitrogen gas into the Ar gas, so as to adjust the concentration of the nitrogen gas in the Ar gas.

Dispersant

A dispersant is a liquid that produces a slurry by having an alloy powder dispersed therein.

A dispersant preferably usable for the present invention may be mineral oil or synthetic oil.

There is no specific limitation on the type of the mineral oil or the synthetic oil. If the mineral oil or the synthetic oil has a kinetic viscosity larger than 10 cSt at room temperature, such an increased viscosity strengthens the binding force between the alloy powder particles and may have an adverse influence on the degree of alignment of the alloy powder during the wet pressing with the magnetic field.

Therefore, the kinetic viscosity of the mineral oil or the synthetic oil at room temperature is preferably not higher than 10 cSt. If the mineral oil or the synthetic oil has a fractional distillation point higher than 400° C., it is difficult to deoil the obtained compact. As a result, the amount of carbon remaining in the sintered body may be increased to deteriorate the magnetic characteristics.

Therefore, the fractional distillation point of the mineral oil or the synthetic oil is preferably not higher than 400° C.

Vegetable oil may be used as the dispersant. The "vegetable oil" refers to oil extracted from vegetables, and there is no specific limitation on the type of vegetable. Examples of the vegetable oil include soybean oil, canola oil, corn oil, safflower oil, sunflower oil, and the like.

Production of the Slurry

The slurry is produced by mixing the obtained alloy powder and the dispersant.

There is no specific limitation on the mixing ratio of the alloy powder and the dispersant. It is preferred that the slurry contains the alloy powder at a concentration that is not lower than 70% on the mass basis (i.e., not lower than 70% by mass). Reasons for this are that with such a concentration range, the alloy powder is supplied into the cavity efficiently at a flow rate of 20 to 600 $cm^3$/sec., and superb magnetic characteristics are obtained.

Preferably, the concentration of the alloy powder in the slurry is not higher than 90% by mass. A reason for this is that with such a concentration, the slurry has a certain level of fluidity with certainty.

More preferably, the concentration of the alloy powder in the slurry is 75% by mass to 88% by mass. Reasons for this are that with such a concentration, the alloy powder is supplied more efficiently, and the slurry has a certain level of fluidity with certainty. Still more preferably, the concentration of the alloy powder in the slurry is not lower than 84% by mass. There is no specific limitation on the method of mixing the alloy powder and the dispersant. The alloy powder and the dispersant may be separately prepared and mixed with respective predetermined weights to produce a slurry. Alternatively, the slurry may be produced as follows: in the process of dry-pulverizing the coarse-pulverized powder by a jet mill or the like to obtain the alloy powder, a container accommodating a dispersant is located at an alloy powder outlet of a pulverization machine such as a jet mill or the like, and the alloy powder obtained as a result of the pulverization is directly recovered into the dispersant in the container. In this case, it is preferred that the container has an atmosphere formed of nitrogen gas and/or argon gas, and that the obtained alloy powder is directly recovered into the dispersant without any contact with the air to produce a slurry. Still alternatively, the coarse-pulverized powder may be wet-pulverized by a vibration mill, a ball mill, an attritor or the like while being held in the dispersant, to produce a slurry of the alloy powder and the dispersant.

(2) Pressure-Injection of the Slurry

As shown in FIG. 4(*a*) and FIG. 4(*b*), the die 10 of the wet pressing apparatus 100 is moved upward from a state where the lower punch 12 is inserted into the through-hole 10H of the die 10, and as a result, the space 16 is formed by the inner wall 10W and the top end 12T of the lower punch 12. As shown in FIG. 4(*b*), on the stage where the die 10 is moved upward sufficiently, the inside of the space 16 is in communication with the injection opening 10P of the die 10.

Next, as shown in FIG. 4(*c*), the slurry 30 is injected into the space 16 through the injection opening 10P. The supply amount of the slurry 30 may be set to the range of, for example, 20 to 150 $cm^3$/sec. If the supply amount is smaller than 20 $cm^3$/sec., it is difficult to adjust the flow rate. In addition, the slurry may not be supplied into the space 16 due to the pipe resistance. By contrast, if the supply amount exceeds 150 $cm^3$/sec., the density of the powder compact may be varied portion by portion. As a result, the compact may be broken when being removed after being pressed, or may be broken by being contracted at the time of the sintering. In addition, the alignment may be disturbed in the vicinity of the injection opening 10P.

The supply amount of the slurry is preferably 30 to 100 $cm^3$/sec., and more preferably 40 to 80 $cm^3$/sec. The supply amount of the slurry is controlled as follows. A flow rate adjusting valve of the hydraulic device acting as the slurry supply device is adjusted to change the flow rate of the oil to be supplied to the hydraulic cylinder of the hydraulic device, and thus to change the speed of the hydraulic cylinder. The slurry 30 is supplied at a pressure of, for example, 1.96 MPa to 14.71 MPa (20 $kgf/cm^2$ to 150 $kgf/cm^2$). The injection opening 10P for the slurry 30 is a hole having a diameter of, for example, 2 mm to 30 mm.

One feature of this embodiment is that while the slurry 30 is injected into the space 16, the space 16 is temporarily or intermittently covered with the non-magnetic lid 34.

The use of the non-magnetic lid 34 allows the slurry 30 to be supplied into the space 16 uniformly, with the concentration variance thereof being suppressed. As a result, the alignment of the powder compact, produced by compression in an aligning magnetic field in a subsequent step, is suppressed from being disturbed. This will be described below in detail.

In the case where the slurry 30 is injected into the space 16 with no use of the non-magnetic lid, the space 16 is usually covered with the upper punch 14. In the case where the space 16 is filled with the slurry in such a usual method, there may be a case where at least a portion of the slurry 30 above the space 16 contacts the plurality of discharge holes 14H of the upper punch 14 or the filter cloth 32 located between the upper punch 14 and the die 10 and as a result, the dispersant contained in the slurry 30 is absorbed. This may increase the concentration of a portion of the slurry 30 that is close to the upper punch 14 above the space 16, which causes the concentration of the slurry 30 to be varied. In addition, even if the magnetic field is applied after the slurry 30 is injected, it is difficult to align the powder particles in a portion of the slurry 30 that is above the space 16. In the case where the space 16 is not covered with the upper punch or the like, the injection of the slurry 30 may cause a portion thereof to jump outside the space 16 or cause a top surface of the slurry 30 to be convexed and concaved. As a result, the concentration of the slurry 30 may be varied, or the slurry may not be supplied into the cavity uniformly. By contrast, in the case where the space 16 is covered with the non-magnetic lid 34, even though the space 16 is filled with the slurry 30 and at least a portion of the slurry 30 contacts the non-magnetic lid 34, the non-magnetic lid 34 prevents the dispersant contained in the slurry 30 from being absorbed. In addition, because the space 16 is covered with the non-magnetic lid 34, the injection of the slurry 30 does not cause a portion thereof to jump outside the space 16 or does not case the top surface of the slurry 30 to be convexed or concaved. Therefore, the slurry 30 is supplied into the cavity uniformly with no concentration variance. This suppresses the density variance or the disturbance of the alignment in the powder compact.

The non-magnetic lid 34 is formed of, for example, rubber or a resin. In the case of being formed of rubber, the non-magnetic lid 34 adheres to the top end of the die 10. Alternatively, the non-magnetic lid 34 may be formed of, for example, silicone, non-magnetic aluminum, non-magnetic stainless steel, or the like, instead of rubber. The non-magnetic lid 34 does not have any through-hole through which the slurry 30 passes. A reason for this is that the dispersant contained in the slurry 30 may possibly be absorbed into such a through-hole, which may cause the concentration variance. Unless the lid is non-magnetic, the lid may be made magnetic by the transverse magnetic field pressing step or the like, resulting in the slurry 30 adhering to the lid. If this occurs, the slurry 30 may not be supplied into the space 16 with the concentration variance being suppressed.

As described above, the non-magnetic lid 34 is not indispensable to carry out the method for producing the sintered rare-earth-based magnet according to the present disclosure. After being injected into the space 16 with no use of the non-magnetic lid 34, the slurry 30 may be stirred by, for example, a rod-like member. In this case, the concentration variance of the slurry 30 is decreased to increase the uniformity. In addition, it is specifically difficult to cause the slurry 30 to enter four corners of the space 16. Therefore, the space 16 may be filled with the slurry 30 until, for example, being overflown with the slurry 30. In this manner also, the concentration variance of the slurry 30 is decreased.

FIG. 4(*d*) schematically shows a state where the non-magnetic lid 34 is slightly lifted from the die 10 such that the space 16 is in communication with the air, to form a gap between the non-magnetic lid 34 and the die 10. As the amount of the slurry 30 is increased, an air component contained in the space 16 is pushed outside through the gap. Such intermittent formation of a gap between the non-magnetic lid 34 and the die 10 allows the inner pressure of the space 16 to be maintained substantially at the atmospheric pressure. Therefore, the slurry 30 is supplied smoothly.

FIG. 4(*e*) shows a state where the space 16 is filled with the slurry 30. In this state, the space 16 is closed by the non-magnetic lid 34, and the amount of the slurry 30 has reached a predetermined value. If the slurry 30 is supplied into the space 16 without the non-magnetic lid 34, the top surface of the slurry 30 may be convexed and concaved as described above in the state where the space 16 is filled with the slurry 30. The non-magnetic lid 34 allows the space 16, having a desired capacity, to be filled with the slurry 30.

The time to close the space 16 by the non-magnetic lid 34 is, for example, when about a half of the space 16 is filled with the slurry 30. Then, as the amount of the slurry 30 supplied into the space 16 is increased, the inner pressure of the space 16 is increased. Therefore, the non-magnetic lid 34 is lifted once or a plurality of times, and as a result, the inner pressure of the space 16 is decreased to a level equal to the atmospheric pressure. Such an operation is realized by, for example, attaching a top surface of the non-magnetic lid 34 to a cylinder and driving the cylinder to move in an up-down direction mechanically or electrically.

While being filled with a predetermined amount of the slurry 30, the space 16 is closed by the non-magnetic lid 34. At this point, it is preferred that the slurry 30 is in contact with a bottom surface of the non-magnetic lid 34. Alternatively, there may be a slight gap (of shorter than 1 mm) at a part of the interface between the slurry 30 and the non-magnetic lid 34.

Another feature of this embodiment is that while the slurry 30 is injected into the space 16, no magnetic field is applied to the space 16 (injection with no magnetic field). If the slurry is injected while a magnetic field is applied to the space 16 (injection with the magnetic field), the density of the powder compact obtained after the pressing may be varied significantly portion by portion. A conceivable reason for this is as follows: while the slurry 30 is injected, the alloy powder in the slurry is attracted to the die 10 or the lower punch 12; and as a result, the alloy powder, which is a solid, and the dispersant, which is a liquid, are separated from each other (solid-liquid separation), and the dispersant thus separated from the alloy powder gathers around the space 16. If the slurry 30 supplied in this state fills the space 16 and then is pressed, the slurry 30 is pressed in a state where the density of the alloy powder (amount of the alloy powder per unit volume) is lower in a peripheral portion of the cavity 10C than in a central portion and a bottom portion of the cavity 10C. As a result, the produced compact may have a density lower in a top portion or in a peripheral portion than in a central portion or in a bottom portion. If the density of the compact varies portion by portion, a sintered magnet obtained as a result of sintering the compact has magnetic characteristics that are lower and varied portion by portion. If the density is varied as described above, the compact may be broken when being removed after being pressed. Even if the compact is not broken on this stage, the sintered body may be broken by being contracted at the time of the sintering. In this embodiment, no magnetic field is applied while the slurry is supplied. Therefore, such a problem of the density variance is solved. It has conventionally been considered that in order to obtain high magnetic characteristics, it is needed to inject the slurry while a magnetic field is applied. A reason for this is that the injection with no magnetic field makes it more difficult to realize alignment specifically in a central portion of the magnet than the injection with the magnetic field. However, as a result of studies, the present inventor has found out that in the case where the slurry 30 is supplied into the space 16 with the concentration variance being suppressed by the above-described method of using the non-magnetic lid and then the transverse magnetic field pressing method is used, uniform alignment is realized in the central portion of the magnet and the magnetic characteristics are not declined. By contrast, if the parallel magnetic field pressing method is used, the magnetic characteristics are declined by an influence of the alignment disturbance caused by the pressing.

Preferably, after the space 16 is filled with the slurry, the lower punch 12 is moved downward with respect to the die 10 as shown in FIG. 4(*f*), such that as shown in FIG. 5(*a*), when the upper punch 14 is moved downward to close the space 16, a gap is formed between the bottom end of the upper punch 14 or the filter cloth (in the case where the filter cloth 32 is used) and the slurry 30. Specifically, the lower punch 12 is moved downward with respect to the die 10 by a distance not shorter than 1 mm and not longer than 30 mm (e.g., 3 mm). As a result, after being filled with the slurry 30, the space 16 expands to form a gap as an air layer above the space 16. The gap has a size that is preferably not shorter than 2 mm and not longer than 4 mm. The gap may have a size of, for example, about 3 mm. In the example shown in FIG. 4(*f*), the die 10 is moved upward with respect to the lower punch 12. The method for forming a gap as an air layer above the slurry 30 is not limited to the example shown in FIG. 4(*f*). Alternatively, for example, the lower punch 12 may be moved downward while the die 10 is positionally secured. Still alternatively, a "mate fitting structure" having a size and a shape fittable to the through-hole 10H of the die 10 may be formed at the bottom surface of the non-magnetic lid 34. Specifically, before or after the gap as the air layer is formed, the non-magnetic lid 34 is retracted from the position at which the non-magnetic lid 34 covers the die 10 (FIG. 3). Namely, before the transverse magnetic field is applied to the cavity 10C, the non-magnetic lid 34 is moved from the position where the non-magnetic lid 34 covers the space 16.

In the state shown in FIG. 4(*f*), the upper punch 14 is away from the die 10. Alternatively, the upper punch 14 may start moving downward at the same time as the die 10 starts moving upward. It is important that even if the upper punch 14 is moved downward, the filter cloth 32 provided at the bottom end thereof should not contact the slurry 30. As long as the upper punch 14 and the die 10 are away from each other, even if the upper punch 14 starts moving downward when, or immediately before, the die 10 starts moving upward, the filter cloth 32 does not contact the slurry 30.

(3) Preparation Before the Pressing with the Transverse Magnetic Field is Started Next, the space 16 is closed by the bottom end 14U of the upper punch 14 to form the cavity 10C filled with the slurry 30. Specifically, as shown in FIG. 5(*a*), the upper punch 14 is moved downward with respect to the die 10 to close the space 16. At this point, the filter cloth 32 is located between the die 10 and the upper punch 14. As described above, it is preferred that a gap as an air layer is formed between the filter cloth 32 and the slurry 30 to prevent the filter cloth 32 from contacting the slurry 30. With this arrangement, the following situation is avoided with certainty: the dispersant contained in the slurry 30 is absorbed into the filter cloth 32 in contact with the slurry 30 before the magnetic field is applied, and as a result, the concentration of the alloy powder is excessively increased in the vicinity of the top surface of the slurry 30 to cause the concentration variance, or the powder particles are not sufficiently aligned even when the magnetic field is applied.

(4) Pressing with the Transverse Magnetic Field

Next, in a state where the "transverse magnetic field" in a direction perpendicular to the direction in which the lower punch 12 is movable upward and downward is applied to the cavity 10C, the distance between the bottom end 14U of the upper punch 14 and the top end 12T of the lower punch 12 is shortened. FIG. 5(*b*) and FIG. 5(*c*) show how the distance between the bottom end 14U of the upper punch 14 and the top end 12T of the lower punch 12 is shortened. The dispersant contained in the slurry 30 is discharged through the plurality of discharge holes 14H of the upper punch 14, and as a result, a compact 50 of the alloy powder is obtained. The magnetic field to be formed inside the cavity 10C has a strength that is, for example, not smaller than 1.0 T and not larger than 1.5 T. It is preferred that when the transverse magnetic field is applied, a gap G as an air layer is present between the filter cloth 32 and the slurry 30. When the transverse magnetic field starts being applied, a part of the alloy powder particles contained in the slurry 30 is moved by a magnetic force, and as a result, a convexed portion or a concaved portion may be formed at the top surface of the slurry 30. Nonetheless, because the magnetic field is horizontal and is orthogonal to the pressing direction, the alignment direction is made uniform by the step of pressing.

As long as the strength of the magnetic field is 1.0 T or larger, the alloy powder contained in the slurry 30 is magnetized in the direction of the magnetic field with more certainty to provide a higher degree of alignment. If the strength of the magnetic field is smaller than 1.0 T, the degree of alignment of the alloy powder is decreased, or the alignment of the alloy powder is easily disturbed at the time of the pressing. The strength of the magnetic field inside the cavity 10C may be measured by a gauss meter or found by a magnetic field analysis.

The electromagnetic coil 20 is located in the vicinity of a side surface of the die 10, and generates a magnetic field that is uniform and perpendicular to the pressing direction in the cavity 10C.

The state inside the cavity 10C will be described in more detail. In the step of pressing with the magnetic field, when the volume of the cavity 10C is decreased, the dispersant in a portion of the slurry 30 that is close to the discharge holes 14H of the upper punch 14 is first filtered and discharged through the discharge holes 14H, among various portions of the slurry as described above. By contrast, the alloy powder contained in the slurry 30 remains in the cavity 10C. Therefore, the "cake layer" is formed from the portion close to the discharge holes 14H. As described above, the cake layer has a high concentration of the alloy powder as a result of the dispersant in the slurry being discharged outside the cavity 10C. As the step of pressing advances, the cake layer expands to the entirety of the cavity 10C, and as a result, a powder compact formed of alloy powder particles contacting each other is obtained. In this embodiment, there is no cake layer formed when the transverse magnetic field starts being applied. Therefore, the alignment disturbance is suppressed in the portion close to the upper punch 14.

After the compact 50 is formed, the die 10 is moved downward as shown in FIG. 5(*d*), and as shown in FIG. 5(*e*), the compact 50 is exposed outside the die 10. Then, as shown in FIG. 5(*f*), the upper punch 14 is moved upward. In this manner, the compact 50 is removed.

The compact obtained by the above-described steps has the dispersant formed of mineral oil, synthetic oil or the like remaining therein. If the compact in such a state is rapidly heated from room temperature to a sintering temperature of, for example, 950 to 1150° C., the inner temperature of the compact is rapidly raised, and as a result, the dispersant remaining in the compact and the rare-earth element of the compact may react to each other to form a rare-earth carbide. If such a rare-earth carbide is formed, generation of a liquid phase in an amount sufficient for the sintering may be inhibited. If this occurs, a sufficiently dense sintered body may not be obtained, and the magnetic characteristics may be declined. Therefore, it is preferred to deoil the compact before the sintering. With this arrangement, the dispersant remaining in the compact is fully removed.

(5) Step of Dividing the Compact into Compact Fragments (First Division Step)

In this embodiment, the compact produced by the pressing with the transverse magnetic field may be divided into a plurality of compact fragments. For example, after the step of producing the above-described compact but before the step of sintering the compact, a first division step may be performed, in which each of the produced compacts is cut and divided into ten or more compact fragments.

In this embodiment, a compact having a size of, for example, 100 mm (length)×100 mm (width)×90 mm (height) is sliced by a wire saw into plate-like compact fragments each having a size of, for example, 9.5 mm (length; direction of magnetization)×100 mm (width)×90 mm (height). The number, the size, and the shape of the compact fragments are not limited to those of this example. Instead of the wire saw, a known cutting blade may be used.

As the size of the compact is larger, a larger number of sintered magnets are produced from one compact. According to the conventional method, as the size of the compact is larger, the density of the slurry is more varied. Therefore, it is difficult to increase the size of the compact. According to an embodiment of the present disclosure, it is possible to produce a compact having a size of at least 90 mm (length)×at least 90 mm (width)×at least 90 mm (height) (preferably, a size of at least 100 mm (length)×at least 100 mm (width)×at least 90 mm (height), more preferably, a size of at least 120 mm (length)×at least 120 mm (width)×at least 100 mm (height), and most preferably, a size of at least 150 mm (length)×at least 150 mm (width)×at least 100 mm (height)).

(6) Sintering Step (Sintered Body Work Production Step)

Next, the compact (compact fragment obtained as a result of the cutting) is sintered to produce a sintered rare-earth-based magnet. In the present disclosure, in the case where the sintered compact fragment is further cut, the sintered compact fragment will be referred to as a "sintered body work". Hereinafter, the compact fragment may be referred to simply as a "compact" for the sake of simplicity.

The compact is sintered at a pressure that is, preferably, not higher than 0.13 Pa ($10^{-3}$ Torr), and more preferably, not higher than 0.07 Pa ($5.0\times10^{-4}$ Torr), and a temperature in the range of 1000° C. to 1150° C. For prevention of oxidation due to the sintering, the residual gas in the atmosphere may be replaced with inert gas such as helium, argon or the like. The sintered body obtained as a result of the sintering the compact fragment may have a size of, for example, at least 4 mm in a length direction×at least 40 mm in a width direction×at least 5 mm in a height direction.

(7) Step of Dividing the Sintered Body Work into Sintered Body Fragments (Second Division Step)

In this embodiment, a second division step is performed, in which the sintered body works obtained as a result of sintering the compact fragments are each cut and divided into a plurality of sintered body fragments. As a result of the second division step, 100 or more sintered body fragments are produced from one sintered body work. The sintered body work may be cut by, for example, a dicing saw or the like. According to this embodiment, 1000 (10×100) or more sintered rare-earth-based magnets are produced from one large compact (at least 90 mm (length)×at least 90 mm (width)×at least 90 mm (height)). This increases the mass-productivity.

In this embodiment, a diffusion step may be further performed, in which a heavy rare-earth element RH (RH is at least one of Tb, Dy and Ho) is diffused from a surface to the inside of the pre-cutting sintered body work. In the case where the heavy rare-earth element RH is diffused from the surface to the inside of the sintered bodywork, the coercivity is effectively enhanced. Such a diffusion step is especially effective in the case where the sintered body work is plate-like and has a thickness that is not less than 1 mm and not greater than 20 mm. The diffusion may be performed from two surfaces facing each other in the thickness direction, so that the heavy rare-earth element RH is diffused deep into the sintered body work efficiently. If the heavy rare-earth element RH is diffused after the sintered body work is divided into the sintered body fragments, the amount of the heavy rare-earth element RH consumed to obtain the required magnetic characteristics tends to be increased. Therefore, it is desirable that the heavy rare-earth element RH is diffused before the sintered body work is divided into the sintered body fragments.

Figure 6:
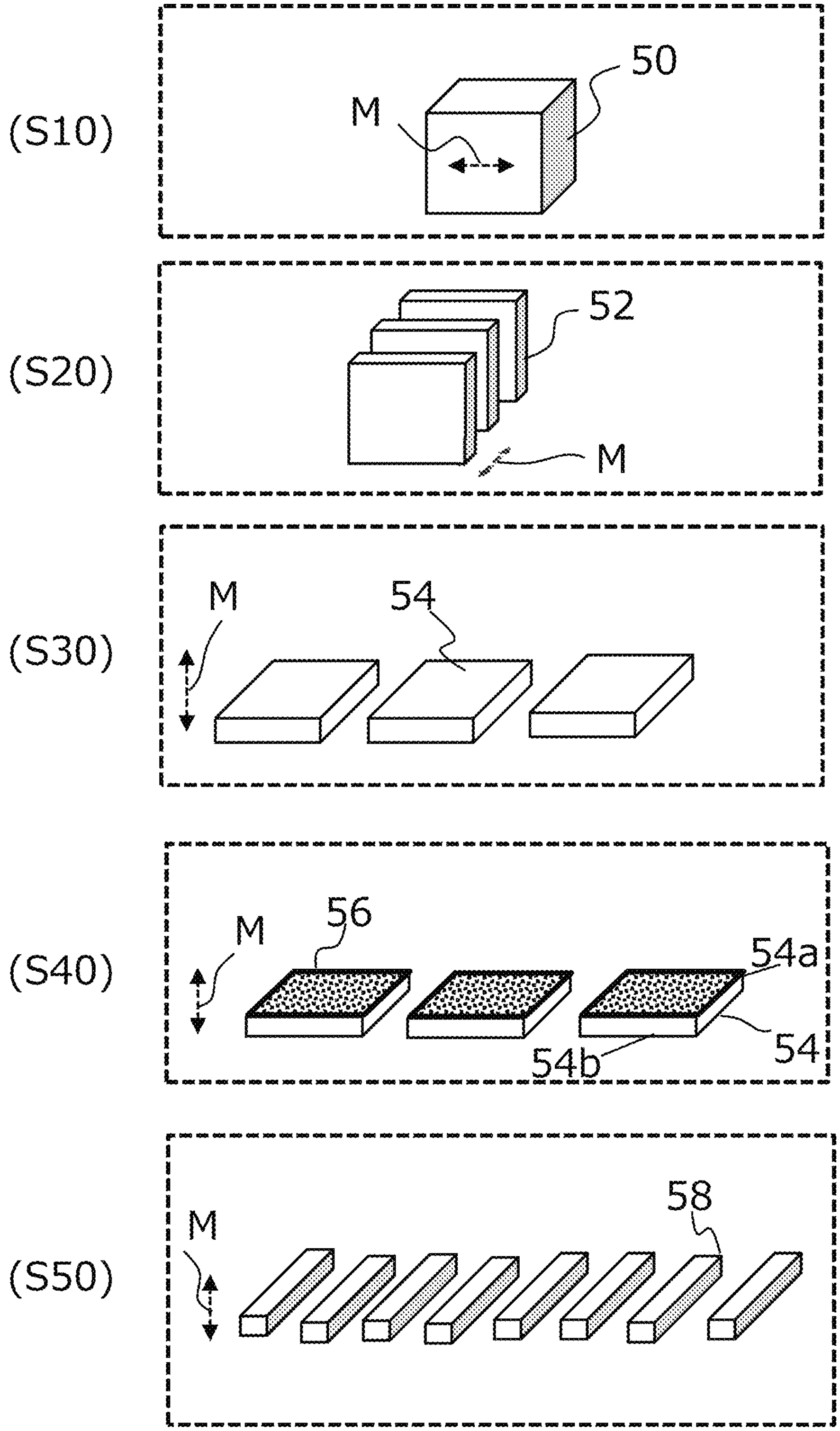
FIG. 6 shows a part of steps of a production method according to this embodiment.

With reference to FIG. 6, a process flow from the step of cutting the powder compact to the step of cutting the sintered body work in a preferred embodiment will be summarized. FIG. 6 shows a direction M of the aligning magnetic field (magnetic field alignment direction) with an arrow. The sintered magnet is magnetized in a direction parallel to the magnetic field alignment direction M in a final product.

The process flow schematically shown in FIG. 6 includes:

a step of preparing the compact 50 (S10);

a step of cutting and dividing the compact 50 into a plurality of compact fragments 52 (S20);

a step of sintering each of the plurality of compact fragments 52 to produce a plurality of sintered body works 54 (S30);

a step of performing a heat treatment in a state where a powder 56 as a diffusion source containing a heavy rare-earth element RH is in contact with at least one of a top surface 54*a* and a bottom surface 54*b* in the thickness direction of each of the sintered body works 54 and thus diffusing at least a part of R contained in the powder as the diffusion source from the top surface 54*a* and/or the bottom surface 54*b* of each of the sintered body works into the inside thereof (S40); and a step of cutting each of the sintered body works 54 from the top surface 54*a* down to the bottom surface 54*b* to divide each of the sintered body works 54 into a plurality of sintered body fragments 58 (S50).

After the sintering step, it is preferred that the sintered body (encompassing the sintered body work and the sintered body fragment) is heat-treated at a temperature lower than the sintering temperature. The heat treatment improves the magnetic characteristics. The heat treatment conditions such as the heat treatment temperature, the heat treatment time and the like may be known conditions. The sintered rare-earth-based magnet obtained in this manner is processed by, for example, a cutting and polishing step and a surface-treating and covering step as necessary, and then is processed by a magnetization step. As a result, a sintered rare-earth-based magnet is obtained as a final product.

EXAMPLES

Example 1

Elements of a raw material alloy were melted in a high frequency induction furnace such that a composition of $Nd_{22}Pr_6Dy_3B_{0.94}Co_2Al_{0.25}Cu_{0.1}$ (% by mass), with the remaining part being Fe, would be obtained. The molten raw material alloy was rapidly cooled by a strip casting method to obtain a flake-like alloy having a thickness of 0.5 mm. The alloy was coarse-pulverized by a hydrogen pulverization method, and then fine-pulverized by a jet mill. The obtained R-T-B-based alloy powder had a particle size $D_{50}$ of 4.7 μm. The R-T-B-based alloy powder was immersed in mineral oil having a fractional distillation point of 250° C. and a kinetic viscosity at room temperature of 2 cSt in a nitrogen atmosphere to prepare a slurry. The slurry had a concentration of 85% by mass.

The wet pressing was performed by use of the wet pressing apparatus shown in FIG. 1. The space 16 of the die 10 used had a size of 100 mm (length)×100 mm (width; magnetic field application direction). The space 16 had a depth of 90 mm. The slurry was supplied from a slurry supply device into the space 16 through the injection (supply)opening 10*p* at a concentration of the slurry of 85% by mass and a supply amount of the slurry of 50 $cm^3$/sec. When about a half of the space 16 was filled with the slurry 30, the space 16 was covered with the non-magnetic lid 34. Then, as the amount of the slurry 30 supplied to the space 16 was increased, the non-magnetic lid 34 was lifted by a cylinder (not shown) a plurality of times to maintain the inner pressure of the space 16 at a level equal to the atmospheric pressure. After the space 16 was filled with the slurry 30, the non-magnetic lid 34 was retracted from the space 16.

Then, as shown in FIG. 4(*f*), the lower punch 12 was moved downward by 3 mm with respect to the die 10, such that a gap would be formed between the filter cloth 32 and the slurry 30 by a downward movement of the upper punch 14. Next, as shown in FIG. 5(*a*), the upper punch 14 was moved downward with respect to the die 10 to close the space 16 and form the cavity 10C. A magnetic field of 1.5 T was applied to the inside of the cavity 10C in the width direction of the cavity 10C (in the direction of the side of the cavity 10C extending by 100 mm) to press the slurry 30 with the transverse magnetic field in a state where a distance between the bottom end 14U of the upper punch 14 and the top end 12T of the lower punch 12 is shortened.

Each of the compacts produced under the above-described conditions was measured regarding the density at 17 different points. The variance was sufficiently small at 0.04 $g/cm^3$.

Next, before the step of sintering the compacts, each of the compacts was cut by wire processing and divided into 20 compact fragments.

The obtained compact fragments were heated from room temperature to 150° C. at a rate of 1.5° C./min. in vacuum, kept at 150° C. for 1 hour, then heated to 500° C. at a rate of 1.5° C./min., deprived of the mineral oil, heated from 500° C. to 1100° C. at a rate of 20° C./min., and held at 1100° C. for 2 hours to be sintered. In this manner, a sintered body work was obtained from each of the compact fragments. The obtained sintered body was confirmed not to be cracked. After this, the step of dividing the sintered body work into 200 sintered body fragments was performed.

The obtained sintered body fragments were each heat-treated at 900° C. for 1 hour, and then heat-treated at 600° C. for 1 hour to obtain a sintered R-T-B-based magnet. The obtained sintered R-T-B-based magnet was mechanically processed to have a size of 7×7×7 (mm). Ten of the R-T-B-based magnets were measured regarding the magnetic characteristics by a BH tracer. The minimum value of the measured $B_r$ was subtracted from the maximum value of the measured $B_r$ to find the $B_r$ variance. The variance was sufficiently low at 0.011 T.

Example 2

Elements of a raw material alloy were melted in a high frequency induction furnace such that a composition of $Nd_{30.1}Pr_{0.5}Dy_{1.0}B_{1.0}Co_{1.0}Al_{0.1}Cu_{0.1}$ (% by mass), with the remaining part being Fe, would be obtained. The molten raw material alloy was rapidly cooled by a strip casting method to obtain a flake-like alloy having a thickness of 0.5 mm. The alloy was coarse-pulverized by a hydrogen pulverization method, and then fine-pulverized by a jet mill. The obtained R-T-B-based alloy powder had a particle size $D_{50}$ of 4.7 μm. The R-T-B-based alloy powder was immersed in mineral oil having a fractional distillation point of 250° C. and a kinetic viscosity at room temperature of 2 cSt in a nitrogen atmosphere to prepare a slurry. The slurry had a concentration of 85% by mass.

The wet pressing was performed by use of the wet pressing apparatus shown in FIG. 1. The space 16 of the die 10 used had a size of 90 mm (length)×100 mm (width; magnetic field application direction). The space 16 had a depth of 85 mm. The slurry was supplied from a slurry supply device into the space 16 through the injection opening 15 at a concentration of the slurry of 85% by mass and a supply amount of the slurry of 50 $cm^3$/sec. When about a half of the space 16 was filled with the slurry 30, the space 16 was covered with the non-magnetic lid 34. Then, as the amount of the slurry 30 supplied to the space 16 was increased, the non-magnetic lid 34 was lifted by a cylinder (not shown) a plurality of times to maintain the inner pressure of the space 16 at a level equal to the atmospheric pressure. After the space 16 was filled with the slurry 30, the non-magnetic lid 34 was retracted from the space 16.

Then, as shown in FIG. 4(*f*), the lower punch 12 was moved downward by 3 mm with respect to the die 10, such that a gap would be formed between the filter cloth 32 and the slurry 30 by a downward movement of the upper punch 14. Next, as shown in FIG. 5(*a*), the upper punch 14 was moved downward with respect to the die 10 to close the space 16 and form the cavity 10C. A magnetic field of 1.5 T was applied to the inside of the cavity 10C in the width direction of the cavity 10C (in the direction of the side of the cavity 10C extending by 100 mm) to press the slurry 30 with the transverse magnetic field in a state where the distance between the bottom end 14U of the upper punch 14 and the top end 12T of the lower punch 12 is shortened (condition A).

For comparison, the slurry 30 was pressed with the transverse magnetic field in substantially the same manner as in condition A except that the magnetic field was applied in the depth direction (in the direction of the depth of the space 16 extending by 85 mm) (condition B). Separately, the slurry 30 was pressed with the transverse magnetic field in substantially the same manner as in condition A except that the non-magnetic lid 34 was not used and the space 16 was covered with the upper punch 14 (condition C).

Two hundred compacts were produced in each of conditions A, B and C. The obtained compacts were heated from room temperature to 150° C. at a rate of 1.5° C./min. in vacuum, kept at 150° C. for 1 hour, then heated to 500° C. at a rate of 1.5° C./min., deprived of the mineral oil, heated from 500° C. to 1100° C. at a rate of 20° C./min., and held at 1100° C. for 2 hours to be sintered. The obtained sintered bodies were each heat-treated at 900° C. for 1 hour, and then heat-treated at 600° C. for 1 hour to obtain a sintered R-T-B-based magnet. The obtained sintered R-T-B-based magnet was mechanically processed to have a size of 7×7×7 (mm) and measured regarding the magnetic characteristics by a BH tracer. The two hundred sintered R-T-B-based magnets produced in each of conditions A, B and C were measured regarding $B_r$ and $H_{cJ}$, and the averages thereof were found. The results are shown in Table 1. The minimum value of the measured $B_r$ was subtracted from the maximum value of the measured $B_r$ to find the $B_r$ variance. The minimum value of the measured $H_{cJ}$ was subtracted from the maximum value of the measured $H_{cJ}$ to find the $H_{cJ}$ variance. The results are also shown in Table 1.

TABLE 1

| CONDITION | $B_r$ (AVERAGE VALUE) (T) | $H_{cJ}$ (AVERAGE VALUE) (kA/m) | $B_r$ VARIANCE | $H_{cJ}$ VARIANCE | REMARKS |
|---|---|---|---|---|---|
| A | 1.44 | 1215 | 0.02 | 30.2 | PRESENT INVENTION EXAMPLE |
| B | 1.35 | 1210 | 0.02 | 30.6 | COMPARATIVE EXAMPLE |
| C | 1.40 | 1208 | 0.02 | 56.3 | COMPARATIVE EXAMPLE |

As shown in Table 1, in the example of the present invention, the $B_r$ variance and the $H_{cJ}$ variance are small. The sintered R-T-B-based magnets having high magnetic characteristics are stably produced. In the case of condition B, the $B_r$ value is significantly lower than that of the example of the present invention (condition A). In the case of condition C, the $B_r$ variance and the $H_{cJ}$ variance are larger than those of the present invention (condition A).

INDUSTRIAL APPLICABILITY

A method for producing a sintered rare-earth-based magnet and a wet pressing apparatus according to the present disclosure are preferably usable for producing a sintered rare-earth-based magnet having a decreased concentration of oxygen. Such a sintered rare-earth-based magnet is usable for various types of motors such as voice coil motors (VCM)

of hard disc drives, motors for electric vehicles (EV, HV, PHV, etc.) and motors for industrial equipment, home appliance products, and the like.

REFERENCE SIGNS LIST

10 . . . die; 10H . . . through-hole; 10W . . . inner wall; 12 . . . lower punch; 12T . . . top end of the lower punch; 14 . . . upper punch; 14H . . . discharge hole of the upper punch; 14U . . . bottom end of the upper punch; 20 . . . electromagnetic coil; 16 . . . space; 30 . . . slurry; 100 . . . wet pressing apparatus

The invention claimed is:

1. A method for producing a sintered rare-earth-based magnet, the method comprising the steps of:

preparing a wet pressing apparatus including:

a die having a through-hole, a lower punch movable upward and downward with respect to the die in a state where at least a tip of the lower punch is inserted into the through-hole, and an upper punch movable upward and downward with respect to the lower punch, wherein the upper punch has a bottom end having a plurality of discharge holes formed therein, the plurality of discharge holes allowing a liquid to pass therethrough; a top end of the lower punch and the bottom end of the upper punch form a cavity inside the through-hole; and a distance between the top end of the lower punch and the bottom end of the upper punch is shortened to decrease a volume of the cavity;

preparing a slurry containing an alloy powder, containing a rare-earth element, and a dispersant;

forming a space by an inner wall of the through-hole of the wet pressing apparatus and the top end of the lower punch of the wet pressing apparatus, and injecting the slurry into the space to fill the space with the slurry;

closing the space by the bottom end of the upper punch to form the cavity filled with the slurry;

shortening the distance between the bottom end of the upper punch and the top end of the lower punch in a state where a transverse magnetic field, in a direction perpendicular to a direction in which the lower punch is movable upward and downward, is applied to the cavity, and discharging the dispersant contained in the slurry through the plurality of discharge holes of the upper punch to produce a compact of the alloy powder; and sintering the compact, wherein while the slurry is injected into the space, no magnetic field is applied to the space and the space is temporarily or intermittently covered with a non-magnetic lid, before the transverse magnetic field is applied to the cavity, the non-magnetic lid is retracted from a position at which the non-magnetic lid covers the space, and the non-magnetic lid does not include a through-hole for introducing or discharging the slurry.

2. The method for producing a sintered rare-earth-based magnet of claim 1, wherein in the step of producing the compact of the alloy powder while shortening the distance between the bottom end of the upper punch and the top end of the lower punch, a filter cloth or a filter is located between the slurry in the cavity and the bottom end of the upper punch.

3. The method for producing a sintered rare-earth-based magnet of claim 1, comprising the steps of:

after filling the space with the slurry, moving the non-magnetic lid from the position at which the non-magnetic lid covers the space; and at least before applying the transverse magnetic field, moving the lower punch downward with respect to the die to form a gap between the slurry and at least one of the bottom end of the upper punch and the filter cloth.

4. The method for producing a sintered rare-earth-based magnet of claim 3, wherein the gap has a size not shorter than 2 mm and not longer than 4 mm.

5. The method for producing a sintered rare-earth-based magnet of claim 1, comprising:

after filling the space with the slurry, moving the non-magnetic lid from the position at which the non-magnetic lid covers the space; and before starting discharging the dispersant contained in the slurry through the plurality of discharge holes of the upper punch, start applying the transverse magnetic field.

6. The method for producing a sintered rare-earth-based magnet of claim 1, comprising the step of, while injecting the slurry into the space, moving the non-magnetic lid upward and downward to temporarily allow the space to be in communication with the outside of the wet pressing apparatus.

7. The method for producing a sintered rare-earth-based magnet of claim 1, wherein while the slurry is injected, the alloy powder in the slurry has a concentration of 75 to 88% by mass.

* * * * *